(12) United States Patent
Aiardi et al.

(10) Patent No.: US 11,215,448 B2
(45) Date of Patent: Jan. 4, 2022

(54) MEASURING DEVICE AND MEASURING METHOD FOR A GROOVED AXIALLY SYMMETRIC BODY

(71) Applicant: T.Q.M. ITACA TECHNOLOGY S.R.L., Mazzano (IT)

(72) Inventors: Pierluigi Aiardi, Mazzano (IT); Gianluca Apostoli, Mazzano (IT); Vincenzo Guerrini, Mazzano (IT); Giovanni Domenico Rubagotti, Mazzano (IT); Federico Scaratti, Mazzano (IT)

(73) Assignee: T.Q.M. ITACA TECHNOLOGY S.R.L., Mazzano (IT)

( * ) Notice: Subject to any disclaimer, the term of this patent is extended or adjusted under 35 U.S.C. 154(b) by 0 days.

(21) Appl. No.: 16/755,991

(22) PCT Filed: Oct. 9, 2018

(86) PCT No.: PCT/IB2018/057797
§ 371 (c)(1),
(2) Date: Apr. 14, 2020

(87) PCT Pub. No.: WO2019/077439
PCT Pub. Date: Apr. 25, 2019

(65) Prior Publication Data
US 2020/0300617 A1  Sep. 24, 2020

(30) Foreign Application Priority Data

Oct. 17, 2017 (IT) .......................... 102017000117026

(51) Int. Cl.
*G01B 11/24* (2006.01)
*G01D 5/14* (2006.01)
*G01B 21/30* (2006.01)

(52) U.S. Cl.
CPC .......... *G01B 11/2416* (2013.01); *G01B 21/30* (2013.01); *G01D 5/14* (2013.01)

(58) Field of Classification Search
CPC ....... G01D 5/14; G01B 21/30; G01B 11/2416
See application file for complete search history.

(56) References Cited

U.S. PATENT DOCUMENTS 4,547,674 A    10/1985  Pryor et al.
8,004,694 B2 *  8/2011  Lee ..................... G01B 11/2433
                                                  356/625

(Continued)

FOREIGN PATENT DOCUMENTS

EP    1593950 A1    11/2005
EP    2541191 A1     1/2013

(Continued)

OTHER PUBLICATIONS

International Search Report and Written Opinion dated Jan. 28, 2019 for counterpart International Application No. PCT/IB2018/057797.

*Primary Examiner* — Michael P LaPage
(74) *Attorney, Agent, or Firm* — Shuttleworth & Ingersoll, PLC; Timothy Klima

(57) ABSTRACT

A measurement method for a grooved axially symmetric body involves detecting the geometry of the peripheral surface of the axially symmetric body, reconstructing a virtual profile corresponding at least to the profile of the lateral flanks of a plurality of recesses or grooves of the peripheral surface of the grooved axially symmetric body, generating a plurality of virtual rounded bodies of a predetermined size and placed each at a tangent to a corresponding pair of lateral sides and making one or more measurements using a centre or another point belonging to said virtual rounded bodies as a reference point.

6 Claims, 2 Drawing Sheets

(56) References Cited

U.S. PATENT DOCUMENTS

2011/0032538 A1    2/2011   Maschirow et al.
2020/0298362 A1*   9/2020   Finkeldey .............. G01B 11/06

FOREIGN PATENT DOCUMENTS

JP        H0545135 A     2/1993
JP        H0545135    *   1/2013   ............. B23Q 17/20

* cited by examiner

MEASURING DEVICE AND MEASURING METHOD FOR A GROOVED AXIALLY SYMMETRIC BODY

This application is the National Phase of International Application PCT/IB2018/057797 filed Oct. 9, 2018 which designated the U.S.

This application claims priority to Italian Patent Application No. 102017000117026 filed Oct. 17, 2017, which application is incorporated by reference herein.

The present invention relates to a measuring device and a measuring method for a grooved axially symmetric body.

Preferably, the object of the invention is a method/system for measuring a plurality of perimetrical geometric parameters of a grooved axially symmetric body, such as for example a grooved ring/hub, a brake disc, a gearwheel or any body which is axially symmetric/rotatable around its own axis of rotation, with one or more axial or circumferential grooves provided on its external periphery.

In the prior art, various methods are known for making such measurements.

For example, manual measuring systems exist wherein instruments have a fork positioned so as to measure the distance between the apexes or grooves of two opposing teeth/grooves. These instruments have an operating principle similar to that of a gauge.

Alternatively, due to the low reliability/accuracy of manual measurements, over time machines have been introduced onto the market which can automatically perform the measurements of interest.

In particular, considering the complex geometry of grooved axially symmetric bodies, made up of numerous circumferentially distributed apexes and grooves, currently the known measuring systems focus mainly on the use of suitably moved and positioned probes.

One of the most common embodiments involves the use of a vertical axis spindle onto which the body to be measured is mounted concentrically.

Outside a workpiece housing zone, there are at least two slides, which can move radially towards or away from the axially symmetric body, each bearing its own probe element.

Usually, the probe elements are defined by substantially spherical elements of appropriate diameter, selected by the operator when calibrating the machine according to the diameter of the body and the dimensions of the grooves.

Once everything has been positioned and calibrated, the slides move the two probe elements, diametrically opposed to each other, to insert them into a respective groove until they come into contact with the lateral flanks of the grooves.

At this point the measurement, i.e. the distance between the two probes, is taken and then they are retracted and moved back towards the workpiece to be inserted into two successive grooves.

Clearly, although such equipment is high-performing and accurate from the point of view of measurement, it is very inefficient from the point of view of versatility and measuring times.

Indeed, first the operator must be provided with a number of differently sized probes, which must be replaced (appropriately and according to experience) with every change of the body to be measured, considerably lengthening the retooling times of the equipment and therefore reducing productivity.

In addition, as indicated just above, the execution of the measurement in successive steps requires an intermittent movement of the rotating body, which considerably lengthens the measuring times and also significantly stresses the rotary actuators (extreme precision being necessary at each stop and restart).

Furthermore, the need to move the probes towards/away from the workpiece, and on the basis of this movement to carry out the measurement, also makes this aspect critical for the accuracy of the measurement.

In light of this, an object of the present invention is to provide a measuring device and a measuring method for a grooved axially symmetric body which overcome the drawbacks of the above-mentioned prior art.

In particular, an object of the present invention is to provide a structurally simple and very versatile measuring device and measuring method for a grooved axially symmetric body.

In addition, an object of the present invention is to provide a measuring device and a measuring method for a grooved axially symmetric body with short set-up times.

Furthermore, an object of the present invention is to provide a particularly accurate and efficient measuring device and measuring method for a grooved axially symmetric body.

Said objects are achieved by a measuring device for a grooved axially symmetric body having characteristics as disclosed herein, as well as by a measuring method for a grooved axially symmetric body having characteristics as disclosed herein.

In particular, the measuring device comprises a support member defining a housing zone for the axially symmetric body.

Said support member has a central axis which, in use, corresponds with a central axis of the axially symmetric body.

The device further comprises a measuring assembly associated with said support member and configured to perform a measurement transverse to said central axis.

According to one aspect of the invention, the measuring assembly comprises measuring means configured to detect one or more dimensions related to the geometry of the peripheral surface of the axially symmetric body and to provide one or more signals representing said one or more dimensions and a processing unit configured to reconstruct a virtual profile corresponding with at least the profile of the lateral flanks of a plurality of recesses or grooves of the axially symmetric body on the basis of said one or more signals.

Preferably, the processing unit is further configured to generate a plurality of virtual rounded bodies of a predetermined size and each positioned at a tangent to a corresponding pair of lateral flanks and to perform one or more measurements using the centre of said virtual rounded bodies as a reference point.

Beneficially, in this way the operator can make the necessary measurements limiting the set-up time only to positioning of the axially symmetric body on the support member, also speeding up the measuring time thanks to the possibility of recreating the overall profile of the piece by means of a single continuous rotation of the body with respect to the measuring device.

The measuring means are preferably configured to detect said one or more dimensions without coming into contact with the peripheral surface of the axially symmetric body.

More preferably, the measuring means comprise at least one laser head arranged circumferentially outside said housing zone, oriented transversely (preferably orthogonally) to said central axis of rotation to detect a distance with respect to the peripheral surface of the axially symmetric body and arranged to provide a first signal representing said distance.

The term "laser head" is used in the present text to define a device generally equipped with a generator of electromagnetic waves oriented transversely to the central axis and incident with the peripheral surface, a receiver of the reflected wave, and a processor suitable to process the signal and determine the distance between the emitter and the surface.

Preferably, means are provided for generating a relative rotational motion between said support member and said measuring assembly, rotatable around an axis of rotation corresponding with said central axis of the support member.

In this respect, the measuring means preferably comprise at least one device for detecting the angular position of the support member or of said measuring assembly, configured to provide a second signal representing said angular position.

In order to optimise the accuracy of the measurement, the measuring assembly also preferably comprises an interface element associated with the detection device, with said at least one laser head, and with said processing unit, said interface element being arranged to receive said first signal and said second signal.

The interface element is configured to synchronise the first and second signals and generate (at least) a third synchronised signal and is configured to send said third signal to the processing unit.

The processing unit is in turn configured to receive this signal and reconstruct the axially symmetric body profile accordingly.

Similarly, the measuring method according to the present invention involves arranging an axially symmetric body, wherein said body is provided with a peripheral surface having a number of recesses or grooves each delimited by a pair of opposing flanks and detecting the geometry of the peripheral surface of the axially symmetric body.

Preferably, this reconstruction is carried out by non-contact measuring means, in order to speed up both the measurement and tooling procedures as much as possible.

Subsequently, a reconstruction is provided of the virtual profile corresponding with at least the profile of the lateral flanks of a plurality of recesses or grooves in the peripheral surface of the grooved axially symmetric body, preferably the entire peripheral surface.

At this point, a plurality of virtual rounded bodies having a predetermined diameter are generated, each positioned at a tangent to a corresponding pair of lateral flanks.

Once the virtual rounded bodies have been generated, one or more measurements can then be made using a centre of said virtual rounded bodies as a reference point.

It should be noted that the term "virtual rounded bodies" in the present text defines either circumferences or portions of them, or generally a rounded body with at least one geometric centre which can be used as a reference point and which is positioned at a tangent to both flanks of the groove.

These and other characteristics, together with the related benefits, will be clearer from the following illustrative, and therefore non-limiting, description of a preferred, and thus non-exclusive, embodiment of a measuring device and a measuring method for a grooved axially symmetric body having the characteristics illustrated in the attached drawings, wherein.

With reference to the attached Figures, the number 1 denotes a measuring device for a grooved axially symmetric body P according to the present invention.

The term "grooved axially symmetric body" is used in the present text to define any substantially axially symmetric workpiece that has a central axis A, typically an axis of rotation, and a grooved or toothed peripheral circumferential surface Pper.

The term "grooved" is used to define the presence, on said peripheral surface Pper, of axial and/or circumferential recesses or teeth or grooves "I", each laterally delimited by a pair of opposing flanks "If".

The flanks "If" are therefore typically oriented along a mainly radial direction, facing each other to define the groove.

Examples of such bodies have been defined above and are grooved rings/hubs, toothed wheels, mainly next-generation components of brake discs, or other.

The device 1 is therefore mainly used in the measurement of geometric/construction parameters of such axially symmetric bodies P and in particular of parameters related to the geometric precision of the circumferential peripheral surface and to geometric balancing parameters.

The device 1 comprises a support member 2 defining a housing zone Z of the axially symmetric body P.

This support member 2 preferably has its own central axis which, in use, corresponds to a central axis A of the axially symmetric body P.

The support member 2 therefore comprises means of centring 2a, preferably expandable, configured to ensure perfect coaxiality between said central axis of the support member 2 and the central axis A of the axially symmetric body P.

In addition, the support member 2 preferably comprises attachment means (not illustrated) configured to attach the axially symmetric body P to the support member 2, preventing relative displacements at least in the radial direction, but preferably also in the axial direction.

It should be noted that the references "axial" and "radial" are used in the present text with reference to the aforementioned central axis, so that the "axial" movements or directions are to be considered as those oriented along (preferably parallel to) the central axis.

The "radial" directions are to be considered as those oriented towards and/or away from the central axis, incident with it and orthogonal to it.

In the preferred embodiment, the support member 2 is oriented so that its central axis develops vertically. The central axis A of the axially symmetric body P is thus preferably vertically oriented in use.

Figure 1:
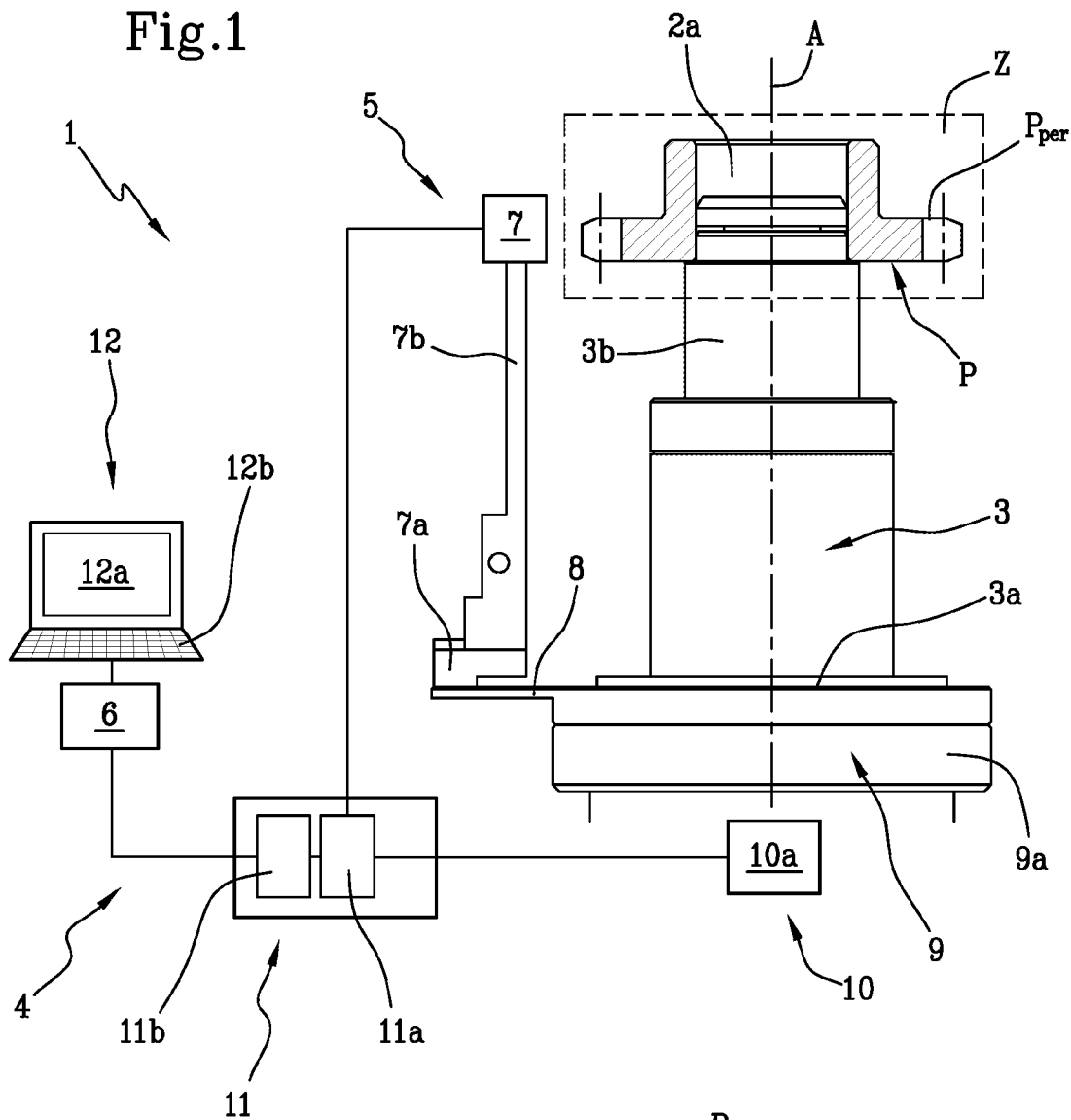
FIG. 1 shows a lateral schematic view of a measuring device for a grooved axially symmetric body according to the present invention.
Figure 2:
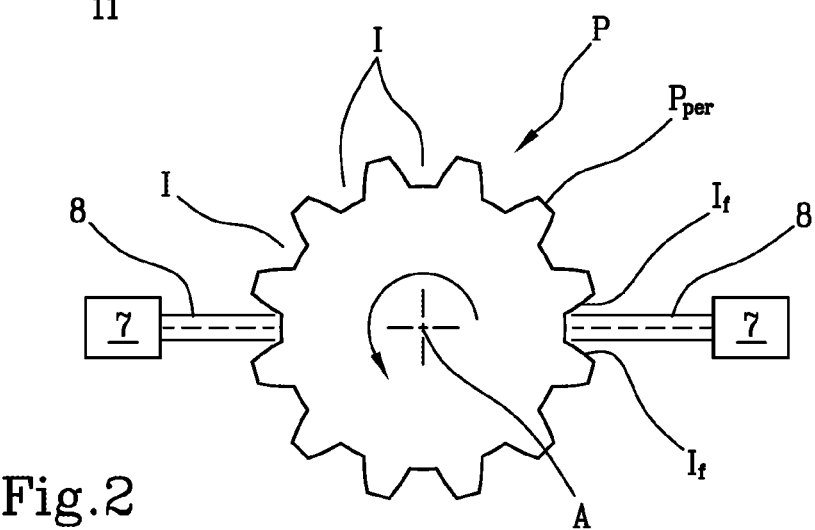
FIG. 2 shows a schematic plan view of the measuring device of FIG. 1.
Figure 3:
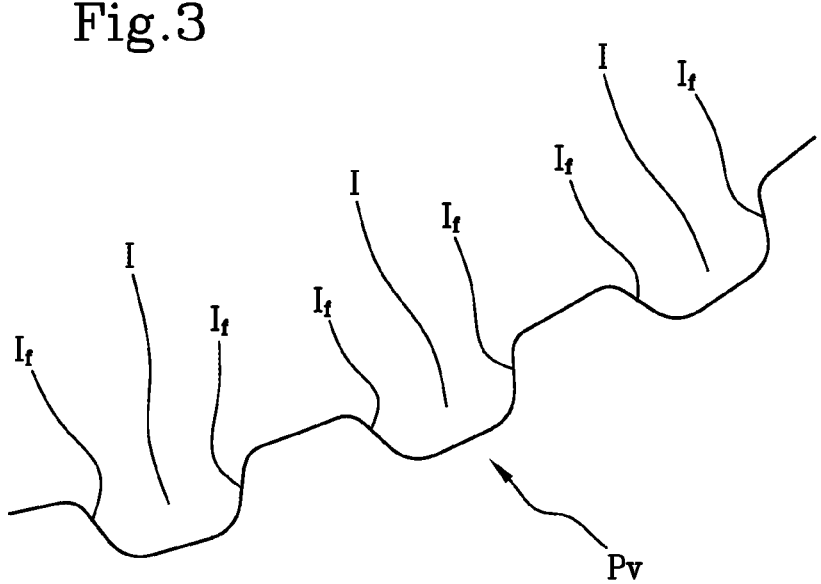
FIGS. 3 and 4 show successive steps of a measuring method for a grooved axially symmetric body according to the present invention.
Figure 4:
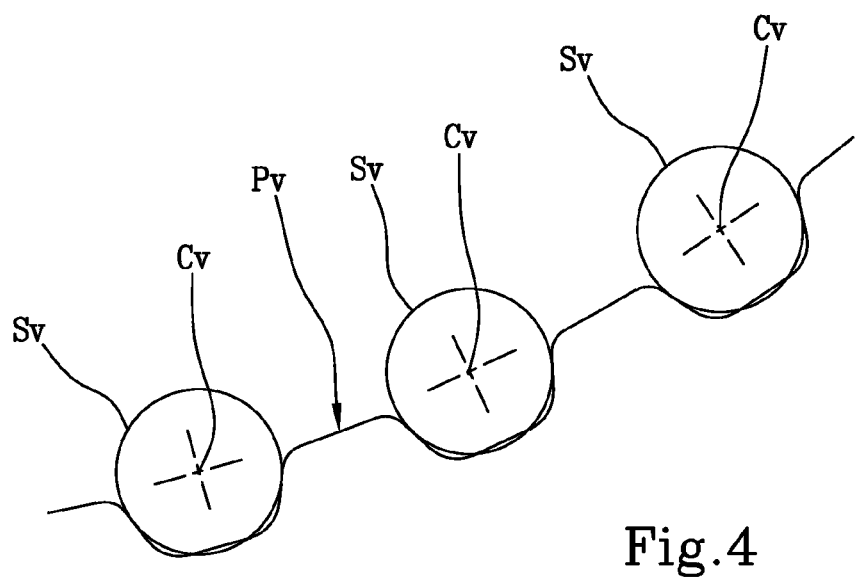

In accordance with what is shown in FIG. 1, the support member 2 preferably has a shaft 3 extending (vertically) from a base 3a as far as its own free end 3b which can be coupled with the axially symmetric body P, preferably inserted in a central mounting hole Ph thereof.

The device 1 further comprises a measuring assembly 4 associated with said support member 2 and configured to perform a measurement transverse to said central axis of the support member 2.

In particular, this measuring assembly 4 comprises measuring means 5 configured to detect one or more dimensions relating to the geometry of the peripheral surface Pper of the axially symmetric body P.

In addition, the measuring means 5 are configured to provide one or more signals representing said one or more dimensions.

The measuring means 5 are preferably configured to detect said one or more dimensions without coming into contact with the peripheral surface Pper of the axially symmetric body P.

Therefore, the measuring means 5 are at least partly non-contact measuring means.

The measuring assembly 4 comprises a processing unit 6 associated with the measuring means 5 and designed to receive said one or more signals representing the detected dimensions from said measuring means 5.

According to an aspect of the present invention, the processing unit 6 is configured to reconstruct a virtual profile corresponding with at least the profile of the lateral flanks lf of a plurality of recesses or grooves l of the axially symmetric body P on the basis of said one or more signals.

In other words, the processing unit is programmed to process the received signals, at least partially reconstructing the profile of the peripheral surface Pper.

The processing unit is preferably configured to reconstruct a virtual profile corresponding with the overall perimeter profile of the axially symmetrical body P on the basis of said one or more signals.

It should be noted that the term "profile" is used in the present text to define a line whose course corresponds with (i.e. interpolates) the point samples detected by the measuring means 5.

Beneficially, in this way the reconstruction of the virtual profile of interest for the measurement is simple and fast, freeing the measurement from the need to be interfaced structurally with the axially symmetric body P.

The measuring means 5 are preferably configured to detect (or sample) a plurality of point values of distances between the measuring means 5 and the points of the peripheral surface Pper positioned at a predetermined height.

Alternatively, it would however also be possible to detect linear samples, whose interpolation would allow the reconstruction of surface profiles and not only linear ones.

Said measuring means 5 preferably comprise at least one laser head 7 arranged radially outside said housing zone Z and oriented transversely (preferably orthogonally) to said axis of rotation A to detect a distance with respect to the peripheral surface Pper of the axially symmetric body P.

This laser head 7 is thus a device generally provided with an electromagnetic wave generator oriented transversely to the central axis A and incident with the peripheral surface, a receiver of the reflected wave, and a processor capable of processing the signal and determining the distance between the emitter and the peripheral surface Pper.

In its preferred embodiment, the laser head 7 has an analogue output and a sampling rate of at least 50 kHz.

The laser head 7 is thus arranged to detect said distance and provide a first signal S1 representing it.

In order to make the system more efficient and robust, the measuring means preferably comprise a plurality of laser heads 7 preferably equally spaced apart angularly from each other.

In addition, in order to increase the versatility of the device 1, each laser head 7 is preferably mounted on a slide 7a coupled to a corresponding radial guide 8 so as to be movable radially towards and away from the central axis A of the support member 2.

This thus makes it possible to adapt the position of the head to the diameter of, for example, the axially symmetric body P.

In addition, still preferably, the laser head 7 is coupled to a pillar 7b aligned with said central axis A in such a way that said laser head 7 can slide (by means of a carriage/skid).

In this way it is thus possible to modify the detection height, allowing the operator to adapt the measurement to the characteristics of the axially symmetric body P.

Beneficially, in the case of more than one laser head, the possibility of varying the measurement height individually furthermore allows the operator to detect a plurality of peripheral profiles simultaneously.

Preferably, the device 1 further comprises means for generating a relative rotational motion 9 of said support member 2 relative to said measuring assembly 4, around an axis of rotation corresponding with said central axis A of the support member 2.

In this way, the number of laser heads 7 required can be kept to a minimum.

In this respect, the measuring means 5 should preferably comprise at least one detection device 10 for detecting the angular position of the support member 2 or the measuring assembly 4 (in particular the laser head 7).

This detection device 10 is configured to provide a second signal S2 representing said angular position.

In the preferred embodiment, the support member 2 can be rotated around its own central axis A.

In this embodiment, the means for generating a relative rotary motion 9 thus comprise a rotary actuator 9a configured to set into rotation said support member 2 with respect to said measuring assembly 4 (in particular with respect to the laser head 7).

In the preferred embodiment, the rotary actuator 9a is defined by a motor, a reduction gear and a drive system, preferably a belt drive system.

With reference to the detection device 10 for detecting the angular position, in this embodiment it comprises an encoder 10a associated with the support member 2 to detect its angular position.

Preferably, said encoder 10a can be of the absolute or relative type.

In order to ensure the acquisition of sufficient samples even at the flanks lf of the grooves, which being steep have a small circumferential development, the encoder 10a has a high resolution.

This encoder 10a preferably has a resolution of more than 20,000 points/revolution.

The measuring assembly 4 further preferably comprises an interface element 11 associated with the detection device 10, said at least one laser head 7, and the processing unit 6.

This interface element 11 (preferably of the hardware type) is arranged to receive the first signal S1 and the second signal S2 from the laser head 7 and the detection device 10 respectively.

Since the signals are different from each other, but complementary, to allow a precise reconstruction of the profile, the interface element 11 is configured to synchronise the first signal S1 and the second signal S2, generating a third signal S3 which is synchronised and contains information that associates the distance detected by the laser head 7 with the corresponding angular position detected by the detection device 10.

This third S3 signal is then sent to the processing unit 6, which can process it to reconstruct the virtual profile Pv.

In the preferred embodiment, the interface element comprises acquisition means 11a for acquiring the first signal S1 and the second signal S2 and a pre-processing module 11b configured to synchronise said first signal S1 and second signal S2, generating the third signal S3.

More preferably, the acquisition means 11a comprise an encoder card to manage the encoder signals and an analogue-to-digital converter for acquiring the laser head signal.

The processing unit 6 is thus configured to generate a plurality of virtual rounded bodies Sv of a predetermined size and each positioned at a tangent to a corresponding pair of lateral flanks lf of a respective groove.

As already briefly mentioned above, the term "virtual rounded bodies" in the present text means defining either circumferences or portions of them, or, generally, a rounded body with at least one geometric centre which can be used as a reference point and which is positioned tangentially to both flanks of the groove.

In the preferred embodiment, the virtual rounded bodies Sv are defined by circumferences/circles having a predetermined diameter Dv.

In this way, the real spheres used in the prior art are beneficially reconstructed virtually without the need for coming into contact with the axially symmetric body P, greatly speeding up the measurement procedure and making it possible to contextually "position" a plurality of virtual circumferences simultaneously.

It should be noted, however, that the diameter Dv is preferably definable by an operator.

In this respect, the device 1 comprises at least one display interface 12 configured to allow an operator to set one or more measurement parameters and, preferably, to display the result of the virtual reconstruction of the profile Pv and the circumferences Sv.

This display interface 12 thus comprises at least one screen 12a and one data input peripheral 12b, more preferably a keyboard or a touchscreen.

Once the virtual rounded bodies Sv have been reconstructed, the processing unit 6 can make one or more measurements using a centre Cv of said virtual rounded bodies Sv as a reference point.

These measurements are preferably made autonomously by the processing unit 6 and/or can be defined by the operator using the aforementioned display interface 12 (which in this case would be a measurement programming interface).

The processing unit 6 is preferably configured to take one or more of the following measurements:
eccentricity of the axially symmetric body P;
roundness of the axially symmetric body P;
run out;
analysis of the harmonics of the acquired profile.

In addition, especially for measuring gearwheels, the processing unit 6 can also perform one or more of the following measurements:
primitive diameter of the axially symmetric body P;
average diameter of the axially symmetric body P;
minimum diameter of the axially symmetric body P;
maximum diameter of the axially symmetric body P;
diameter between the spheres of the axially symmetric body P,
height of the rollers of the axially symmetric body P;
number of teeth or grooves of the axially symmetric body P;
pitch between the teeth or grooves of the axially symmetric body P;
angular position of each tooth or groove;
diameter of the bottom teeth or grooves;
diameter of the tooth crest or groove crest;
height of the teeth or depth of the grooves.

All the above measurements can beneficially be made at the software level, without the need to maintain the axially symmetric body on the device 1 and without the need to make multiple measurements sequentially.

The measuring device 1 is therefore configured to implement a measuring method, partly already described above, which is also the subject of the present invention.

The measuring method according to the present invention is in any case to be considered independent from the device 1 and may also be implemented with other types of measuring devices.

This method provides for arranging a grooved axially symmetric body P provided with a peripheral surface Pper having a plurality of recesses or grooves l each delimited by a pair of opposing flanks lf.

The description of the axially symmetric body P has already been given above, therefore all the characteristics mentioned in relation to the device 1 can also be used, mutatis mutandis, in relation to the present method.

The first step is to measure the geometry of the peripheral surface Pper of the axially symmetric body P.

In the preferred embodiment, detection of the geometry of the peripheral surface Pper of the axially symmetric body P is achieved according to the following procedure:
rotating the axially symmetric body P around its own central axis A;
detecting a plurality of angular positions of the axially symmetric body P during the rotation;
detecting the distance of a plurality of points of the peripheral surface $P_{per}$ with respect to a fixed reference point positioned in a radially external position with respect to said axially symmetric body P;
correlating each distance with a corresponding angular position.

In this regard, it is envisaged that a synchronisation step be performed between the detection of the plurality of angular positions and the detection of said distance in order to associate a corresponding distance with each angular position detected.

This is preferably done by non-contact measuring means 5. Examples of such measuring devices have been provided above.

A virtual profile Pv is now reconstructed corresponding with at least the profile of the lateral flanks lf of a plurality of recesses or grooves l of the peripheral surface Pper of the grooved axially symmetric body P.

The virtual profile preferably corresponds with the entire peripheral surface profile of the axially symmetric body P.

Once this virtual profile Pv has been reconstructed, a plurality of virtual rounded bodies Sv of a predetermined size are generated, each positioned at a tangent to a corresponding pair of lateral flanks lf.

The rounded bodies are preferably defined by circles/circumferences with a pre-set diameter Dv.

At this point, the measuring method provides for performing one or more measurements using a centre Cv or another point belonging to said virtual rounded bodies Sv as a reference point.

Examples of the type of measurement carried out are listed above for the device 1, but remain valid also for the description of the present method.

The invention achieves its intended objects and significant benefits are thus obtained.

Carrying out detection of the peripheral surface of the axially symmetric body with virtual reconstruction of the same and subsequent/contextual generation of the virtual spheres thus makes it possible to speed up exponentially both the set-up time and the measurement time.

The invention claimed is:

1. A measuring system for a grooved or toothed axially symmetric body having a peripheral surface with a plurality of recesses or grooves each delimited by a pair of opposing lateral flanks; said measuring system comprising:
   a support member defining a housing zone for the axially symmetric body, wherein the support member has a central axis which, in use, corresponds to a central axis of the axially symmetric body;
   a measuring assembly associated with said support member and configured to perform a measurement transverse to said central axis of the support member;
   wherein said measuring assembly comprises:
   a measuring device configured to detect one or more dimensions related to a geometry of the peripheral surface of the axially symmetric body and to provide one or more signals representing said one or more dimensions;
   a processing unit, including a processor and software, configured to:
      reconstruct a virtual profile corresponding with at least a measured profile of the lateral flanks of a plurality of recesses or grooves of the axially symmetric body based on said one or more signals;
      generate a plurality of virtual rounded bodies having a predetermined size and each positioned at a tangent to a corresponding pair of the lateral flanks;
      perform one or more measurements using a center or another point belonging to said virtual rounded bodies as a reference point,
   wherein said measuring device comprises at least one laser head disposed radially outside said housing zone, oriented along a direction toward said central axis, incident and orthogonal to said central axis to detect a distance with respect to the peripheral surface of the axially symmetric body and configured to provide a first signal representing said distance,
   wherein said measuring device comprises a rotation device, including a motor, for generating a relative rotational motion between said support member and said measuring assembly, rotatable around an axis of rotation corresponding with said central axis of the support member,
   wherein the measuring device comprises a detection device, including an encoder, for detecting an angular position of the support member or of said measuring assembly and configured to provide a second signal representing said angular position,
   wherein said measuring assembly comprises a hardware interface element comprising an analog-to-digital converter for acquiring the first signal, an encoder card to manage the second signal and a pre-processing module,
   wherein said hardware interface element is operatively connected with the detection device, with said at least one laser head and with said processing unit;
   and wherein:
   said analog-to-digital converter is configured to receive said first signal;
   said encoder card is configured to receive said second signal;
   said pre-processing module is configured to synchronize said first signal and said second signal and to generate a third synchronized signal linking the distance detected to the at least one laser head to a specific angular position;
   said hardware interface element being further configured to send said third signal to the processing unit; said processing unit being configured to reconstruct said virtual profile on the basis of said third signal.

2. The measuring system according to claim 1, wherein said measuring device is configured to detect said one or more dimensions without coming into contact with the peripheral surface of the axially symmetric body.

3. The measuring system according to claim 1, wherein said support member is rotatable around the central axis corresponding with said axis of rotation; wherein the encoder is associated with said support member to detect an angular position thereof.

4. The measuring system according to claim 1, wherein said processing unit is configured to reconstruct the virtual profile to correspond with an overall perimeter profile of the axially symmetric body based on said one or more signals.

5. The measuring system according to claim 1, wherein the processing unit is configured to perform one or more of the following measurements:
   eccentricity of the axially symmetric body;
   roundness of the axially symmetric body;
   run out;
   analysis of harmonics based on the virtual profile;
   primitive diameter of the axially symmetric body;
   average diameter of the axially symmetric body;
   minimum diameter of the axially symmetric body;
   maximum diameter of the axially symmetric body;
   number of teeth or grooves of the axially symmetric body;
   pitch between the teeth or grooves of the axially symmetric body;
   angular position of each tooth or groove;
   diameter of the bottom teeth or grooves;
   height of the teeth or depth of the grooves;
   diameter between spheres of the axially symmetric body;
   height of rollers of the axially symmetric body;
   diameter of a tooth crest or groove crest.

6. A measuring method for a grooved axially symmetric body, comprising the following steps:
   arranging a grooved axially symmetric body provided with a peripheral surface having a plurality of recesses or grooves each delimited by a pair of opposing lateral flanks;
   detecting a geometry of the peripheral surface of the axially symmetric body;
   reconstructing a virtual profile corresponding with at least a measured profile of the lateral flanks of a plurality of recesses or grooves of the peripheral surface of the grooved axially symmetric body;
   generating a plurality of virtual rounded bodies having a predetermined dimension and each positioned at a tangent to a corresponding pair of the lateral flanks;
   performing one or more measurements using a center of said virtual rounded bodies as a reference point
   wherein said detection of the geometry of the peripheral surface of the axially symmetric body is performed according to the following procedure:
   rotating the axially symmetric body around a central axis of the axially symmetric body;
   detecting a plurality of angular positions of the axially symmetric body during the rotation;

detecting a radial distance of each of a plurality of points of the peripheral surface with respect to a fixed reference point positioned in a radially external position with respect to said axially symmetric body;

subsequently correlating each radial distance with a corresponding angular position after and generating a corresponding signal which is synchronized and contains information associating the detected radial distance with the corresponding detected angular position.

* * * * *